(12) United States Patent
Pearson (10) Patent No.: US 11,761,976 B2
(45) Date of Patent: Sep. 19, 2023

(54) FLUID FLOW MEASURING DEVICE, SYSTEM AND METHOD

(71) Applicant: THE SECRETARY OF STATE FOR DEFENCE, Salisbury (GB)

(72) Inventor: Alan James Pearson, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 0 days.

(21) Appl. No.: 17/279,517

(22) PCT Filed: Oct. 11, 2019

(86) PCT No.: PCT/GB2019/000147
§ 371 (c)(1),
(2) Date: Mar. 24, 2021

(87) PCT Pub. No.: WO2020/089570
PCT Pub. Date: May 7, 2020

(65) Prior Publication Data
US 2021/0396778 A1    Dec. 23, 2021

(30) Foreign Application Priority Data
Oct. 31, 2018   (GB) ...................................... 1817749

(51) Int. Cl.
*G01P 5/04*   (2006.01)
*G01F 1/28*   (2006.01)
*G01P 1/02*   (2006.01)

(52) U.S. Cl.
CPC .................. *G01P 5/04* (2013.01); *G01F 1/28* (2013.01); *G01P 1/026* (2013.01)

(58) Field of Classification Search
CPC ............... G01P 5/04; G01P 1/026; G01F 1/28
(Continued)

(56) References Cited

U.S. PATENT DOCUMENTS 2,959,052 A * 11/1960 Alexander ................ G01P 5/02
73/170.15
3,212,329 A * 10/1965 Bisberg ..................... G01P 5/04
73/170.15
(Continued)

FOREIGN PATENT DOCUMENTS

CN    203772891 U    8/2014
DE    102014207929 B3    10/2015
(Continued)

OTHER PUBLICATIONS

Cimbala, "Drag on Spheres", Penn State University (Year: 2012).*
(Continued)

*Primary Examiner* — Nathaniel T Woodward
(74) *Attorney, Agent, or Firm* — Kilpatrick Townsend & Stockton LLP (57) ABSTRACT

A sensing element is provided for use in a system for measuring fluid flow, such as, turbulent air flow. The sensing element comprises a sensor body and a first load cell arrangement connected to the sensor body. The sensor body has a three dimensional shape which is rotationally symmetric about a longitudinal axis passing through the first load cell arrangement and the sensor body. The first load cell arrangement is configured to measure the force exerted on the sensor body by fluid flow in at least an xy plane perpendicular to the longitudinal axis. A system for measuring fluid flow comprising the sensing element and a method for measuring fluid flow using the sensing element and the system are also provided.

20 Claims, 7 Drawing Sheets

(58) Field of Classification Search
USPC .................................................... 73/170.15
See application file for complete search history.

(56) References Cited

U.S. PATENT DOCUMENTS

| | | | | |
|---|---|---|---|---|
| 3,964,306 A | * | 6/1976 | Fletcher | G01M 9/065 |
| | | | | 73/170.15 |
| 5,117,687 A | * | 6/1992 | Gerardi | G01L 5/223 |
| | | | | 73/170.15 |

FOREIGN PATENT DOCUMENTS

| | | |
|---|---|---|
| GB | 1408139 A | 10/1975 |
| WO | 2017031508 A1 | 2/2017 |
| WO | WO-2017031508 A1 * | 2/2017 |
| WO | 2018097236 A1 | 5/2018 |

OTHER PUBLICATIONS

International Patent Application No. PCT/GB2019/000147, International Preliminary Report on Patentability dated May 14, 2021, 9 pages.
United Kingdom Patent Application No. GB1817749.3, Search Report dated Apr. 29, 2019, 3 pages.
International Patent Application No. PCT/GB2019000147, International Search Report and Written Opinion dated Jan. 3, 2020, 13 pages.
United Kingdom Patent Application No. GB1915012.7, Combined Search and Examination Report dated Feb. 5, 2020, 7 pages.
Donelan et al., "Miniature Drag Sphere Velocity Probe," Review of Scientific Instruments, Mar. 1, 1978, pp. 298-304, vol. 49, No. 3, American Institute of Physics, Melville, NY, US.

* cited by examiner

FLUID FLOW MEASURING DEVICE, SYSTEM AND METHOD

TECHNICAL FIELD OF THE INVENTION

The invention relates to a sensing element for use in a system for measuring fluid flow, especially the measurement of turbulent air flow. The invention also relates to a system for measuring fluid flow comprising the sensing element and to a method for measuring fluid flow using the sensing element and the system.

BACKGROUND TO THE INVENTION

In the field of fluid flow measurement, and more particularly the field of measuring air speed, direction and/or pressure, a number of measurement devices are known. Such devices are typically designed to measure steady flow in low velocity environments.

Known examples of air flow measuring devices include cup and vane anemometers. Such devices generally require pre-positioning relative to the direction of air flow, or may require re-orientation with respect to changes in the direction of the flow of air, thereby limiting the responsiveness of the devices in certain situations. For example, the prior art devices may be unsuitable for use in turbulent flow environments. Alternative devices, such as ultrasonic anemometers, generally comprise an arrangement of electronic components often making them more complex to operate and manufacture than simple mechanical alternatives.

SUMMARY OF THE INVENTION

According to a first aspect, the invention provides a sensing element for use in a system for measuring fluid flow, the sensing element comprising a sensor body and a first load cell arrangement connected to the sensor body, wherein the sensor body has a three dimensional shape which is rotationally symmetric about a longitudinal axis passing through the first load cell arrangement and the sensor body and wherein the first load cell arrangement is configured to measure the force exerted on the sensor body by fluid flow in at least an xy plane perpendicular to the longitudinal axis.

When the sensor body is subjected to fluid flow, such as the flow of air, this causes the sensor body to move in response to the force exerted upon it by the fluid flow. The deflection of the sensor body imparts a force on the first load cell arrangement to which it is connected. The response of the sensor body measured by the load cell arrangement can be used to derive properties of the fluid flow such as one or more of the speed, direction, velocity, static pressure and dynamic pressure. The response may be measured by the load cell arrangement as a force exerted on the sensor body by fluid flow.

Advantageously the degree of deflection of the sensor body, relative to the first load cell arrangement, may be proportional to the force imparted on the sensor body by the fluid flow, more advantageously, the deflection of sensor body may be directly proportional to the force imparted on the sensor body by the flow of fluid.

In the invention, the sensor body has a three dimensional shape which is rotationally symmetric about a longitudinal axis. The rotational symmetry of the sensor body provides for a sensor element which is similarly responsive to fluid flow from multiple directions about the longitudinal axis. Due to the rotational symmetry, the surface presented by the sensor body to fluid flow is substantially similar from a plurality of directions about the longitudinal axis. Thereby, fluid flow making contact with the sensor body from a plurality of directions induces a substantially similar corresponding deflection response in the sensor body without requiring the sensing element to be pre-aligned, and/or re-aligned during use, with regard to the prevalent direction of fluid flow. As a result, the sensing element is responsive to changes in the direction of fluid flow.

The sensing element is particularly suited to measuring the force exerted by fluid flow in turbulent environments, where rapid, and often unpredictable, changes in speed and direction of fluid flow can occur. An example of a turbulent environment is the dynamic flow of air associated with a blast event. During a blast event, air velocity and pressure can vary rapidly and unpredictably in both direction and magnitude requiring a sensor which responds rapidly to one or both variables. For example, it can be particularly challenging to measure the properties of air flow during an explosion in a confined, or partially confined, area, such as, within a building. When explosions occur within a building, blast shock waves are often reflected from walls and other interior structures. These reflections can cause changes in the direction and/or magnitude of fluid flow, often making it more difficult to predict the optimum position and orientation of fluid flow sensors. Therefore, the multi-directionality of the sensor element of the present invention may be particularly suited to use within a confined blast environment.

Advantageously, sensor body may have n-order rotational symmetry about the longitudinal axis, where n>2.

In the invention, the sensor body is rotationally symmetric so that the body presents a similar sensing surface to impinging flow from a plurality of directions about the longitudinal axis. The value of n in the n-fold rotational symmetry may be selected for the particular application. The skilled person will understand that the higher the value of n, i.e. the closer the rotational symmetry comes to circular symmetry about the longitudinal axis, the more uniform the sensor element's response will be to differing directions of flow. However, the invention is not intended to be limited to circular symmetry, and in some circumstances lower values of n may be quite sufficient. For example, n may be 10, or may be >20, or may be 50.

The shape of the sensor body may be selected from a sphere, an ellipsoid, and a cylinder. Sensor bodies for which the three dimensional shape is a sphere, an ellipsoid or a cylinder have a substantially continuous circular rotational symmetry about the longitudinal axis, such that the surface shape of the sensor body is substantially similar from any direction 360 degrees about the longitudinal axis. Fluid flow striking the sensor body from any direction in the xy plane would therefore induce a corresponding substantially similar deflection response in the sensor body without the need for alignment of the sensing element to the direction of fluid flow. For instance, a force impacting on the surface of the sensor body due to a fluid flow being of substantially equal magnitude, but differing in direction to a previously impacting fluid flow, will induce a substantially similar magnitude of deflection of the sensor body but in a different direction, the direction in each case corresponding to the direction of impacting fluid flow.

More advantageously, when the sensor body is spherical, or substantially spherical in shape, fluid flow contacting the sensor body induces a corresponding substantially similar deflection response in the sensor body irrespective of direction. A spherical sensor body therefore provides for a sensor element capable of the omnidirectional sensing of fluid flow without the need to align the sensing element to the direction of fluid flow. A spherical sensor body is therefore particularly suitable for the measurement of turbulent fluid flow in the xy plane and also along the longitudinal axis.

For applications where fluid flow measurements may be required only in the two dimensions of the xy plane, the substantially continuous rotational symmetry of a substantially spherical sensor body may reduce the interference of the sensor body with the flow of fluid, thereby also improving the accuracy of the measurement of fluid flow in the xy plane.

Preferably, the shape of the sensor body may be selected from a polyhedron, more preferably a regular polyhedron or a regular prism. For instance, polyhedrons having a larger number of faces, and thereby presenting a greater degree of rotational symmetry, will provide for a more uniform response of the sensor element to differing directions of flow. Sensor bodies having a shape selected from the higher sided regular polyhedrons, such as an octahedron, a dodecahedron and an icosahedron are therefore particularly advantageous. The sensor body may be a geodesic polyhedron. Geodesic polyhedrons may provide for a sensor body having a high degree of rotational symmetry.

The shape of the sensor body may be selected to control the coefficient of drag of the sensor body. For example, in the case of a polyhedron, the number and/or geometry and/or profile of the faces, or any combination thereof, may be optimised to control the coefficient of drag. Optionally, whole of part of the faces of the polyhedron may be flat, or may comprise a convex curve or a concave curve.

The sensor body comprises an outer surface, wherein the outer surface may comprise a texture selected to control the coefficient of drag of the sensor body. The inclusion of a texture in this way may be used to introduce turbulent boundary layers onto the surface of the sensor body. In particular, the texture may be selected to optimise the Reynolds numbers over which the coefficient of drag remains substantially constant. A coefficient of drag which is substantially constant over a range of Reynolds numbers reduces the complexity of the calculation of flow properties such as flow speed and velocity. The texture may be selected such that the coefficient of drag remains substantially constant over a range of fluid flow velocities of interest. For example, the texture may be selected such that the coefficient of drag remains substantially constant over the fluid velocity range from about 15 m/s to 300 m/s.

For example, the coefficient of drag for a spherical sensor body having a smooth outer surface and no textured region may vary considerably with Reynolds Number. The introduction of a textured region to such a spherical sensor body may be used to control the Coefficient of Drag such that it remains substantially constant over a selected range of fluid flow velocities thereby more readily enabling the calculation the flow speed using the drag equation:

$$u = \sqrt{\frac{2F_d}{\rho C_d A}}$$

Where:
$F_d$=Force on sphere in the direction of the flow velocity
$C_d$=Drag coefficient
A=Cross sectional area of sphere
$\rho$=Mass density of fluid
u=Flow speed The textured region may comprise any suitable surface modifications covering part, or substantially all, of the outer surface of the sensor body. The surface modifications may be localised deformations of the surface of the sensor body, and thereby the surface modifications may not substantially change the three dimensional shape of the sensor body.

Preferably, the texture may comprise a plurality of depressions. More preferably, the texture may comprise a plurality of dimples. Advantageously, the texture may comprise a plurality of raised regions.

The profile of the surface modifications may have a cross-section which is substantially circular or polygonal, or regular polygonal. The surface modifications may be substantially uniform in size, shape and/or distribution. The surface modifications may have a close-packed configuration.

The depth and/or profile of the depressions and/or raised regions may be optimised to control the coefficient of drag. For example, the profile of the depressions and/or raised regions may be concave or convex.

The mass of the sensor body may be selected to control the inertial response of the sensor body when subjected to fluid flow. Controlling the inertial response of the sensor body controls how responsive the sensor body is to changes in fluid flow. A sensor body of lower mass may have less inertia and therefore may respond more rapidly to changes in fluid flow. A typical sensor body for use in the invention might have a mass in the range of 1 g to 100 g, more preferably in the range of 1 g to 20 g, even more preferably in the range 10 g to 20 g.

Preferably, the sensor body is hollow. The sensor body may comprise any number of hollow cavities. For example, the sensor body may be a hollow sphere. Having one or more hollow cavities within the sensor body offers a convenient means of controlling the mass of the sensor body.

Optionally, the sensor body may comprise one or more interior support members. Interior support members may be used to improve the structural stability, such as, the rigidity of the sensor body. This may be particularly advantageous for improving the resistance to damage from fluid flow, particularly turbulent fluid flow. This may also be advantageous for increasing the stiffness of the sensing body allowing for a more efficient transfer of the drag forces to the sensing element, improving the measurement of fluid flow. The supports may be arranged in a number of different configurations, such non-limiting examples include supports arranged in a honey comb structure, supports arranged to form wedge-shaped segments in the interior of the sensor body, and/or one or more supports arranged to span the diameter of the sensor body as bracing supports, or any combination thereof.

Interior supports may be particularly advantageous when incorporated into a sensor body which is hollow, or a sensor body formed from a material having a lower rigidity than the material used to form the supports. Interior supports may enable the sensor body to have good structural stability whilst also controlling the mass, and hence the inertial response, of the sensor body.

The sensor body may be formed from any suitable material. Preferably, the sensor body is formed from one or more materials selected to remain substantially rigid when subjected to the force of a fluid flow. The material from which the sensor body is formed may be optimised to withstand the fluid flow forces associated with a particular use such as use in turbulent and/or high pressure environments. For example, the sensor body may be formed from a polymer, polymer composite, metal, metal alloy, wood, cardboard, or any combination thereof. Advantageously, the sensor body may comprise a polymeric material, more advantageously, the sensor body may be formed substantially from a polymeric material. Polymeric materials typically have favourable rigidity per unit mass. Examples of such polymeric materials include, but are not limited to, nylon and Acrylonitrile Butadiene Styrene (ABS).

The sensing element may comprise a second load cell arrangement, the first load cell arrangement and the second load cell arrangement being arranged at opposing sides of the sensor body. In this arrangement, the first and second load cell arrangements are positioned opposite one another such that the longitudinal axis passes through both the first load cell arrangement and the second load cell arrangement.

Due to their opposing arrangements, the force measurements of the first and second load cell arrangements may be averaged so as to reduce the impact of any signal noise, increasing the accuracy of the sensing element when used to measure fluid flow.

The first and second load cell arrangements may be attached directly or indirectly to the sensor body by any suitable attachment means including, but not limited to, one or more of a bracket, adhesive, and complementary inter-engaging fixings such as a pin/opening arrangement and a threaded/screw arrangement. The attachment means may comprise male/female portions of the sensor and/or load cell(s).

The load cell arrangement(s) may be removably attached to the sensor body to permit any of the load cell arrangement(s) and/or senor body to be removed and replaced, for example, in the event of damage or malfunction.

The first load cell arrangement and optionally second load cell arrangement may be further configured to measure the force exerted on the sensor by fluid flow along the longitudinal axis. More preferably, both the first and the second load cell arrangements are configured to measure the force exerted on the sensor by fluid flow along the longitudinal axis.

The first and/or optional second load cell arrangement(s) may comprise a single load cell arranged to measure load due to fluid flow incident upon the sensing element in at least the xy plane, and more preferably in the direction of the longitudinal axis. Alternatively, first and/or optional second load cell arrangement(s) may comprise two or more load cells, wherein each load cell is arranged to measure fluid flow in one of the x direction, the y direction, and optionally in the direction of the longitudinal axis.

The two or more load cells within the load cell arrangement(s) may be connected to each other by means of a sensing member. For example, the sensing member may be a bar extending through the sensor body to which one or more of the load cells are attached. The sensing member may arranged to be deformable in response to a fluid force incident on the sensor body.

The two or more load cells within the load cell arrangement(s) may be attached to one another by means of an isolating member arranged to prevent transmission of vibrations between the load cells.

The load cells may be any suitable load cell capable of measuring loads exerted on the sensor body as a result of fluid flow. Advantageously, the load cells may be configured to measure loads exerted by fluid flow in the range 0 g to 2000 g. Examples of load cells include, but are not limited to, piezoelectric load cells, capacitive load cells, electromagnetic load cells, strain gauge load cells, optical load cells, resonant load cells, potentiometric load cells and magnetorestrictive load cells. Preferably, one or both of the first load cell arrangement and the second load cell arrangement may comprise one or more strain gauges.

The sensing element may comprise one or more shrouds, wherein said shrouds may be arranged to enclose or partly enclose one or both or the first load cell arrangement and the second load cell arrangement. The shroud may optionally be arranged to enclose or partly enclose the attachment means between the sensing element and the load cell arrangement(s). This may reduce the drag on the attachment means and therefore help to reduce any error in the measurement of fluid flow. Optionally, the shroud may be arranged to enclose or partly enclose the support structure. This may reduce the drag on the support structure and therefore help to reduce any error in the measurement of fluid flow.

The shrouds may be arranged to at least partially shield the load cell arrangement from contact with the fluid flow. By at least partially isolating the load cell arrangement from the fluid flow, the one or more shrouds may be configured to control unwanted signals which may be introduced by fluid flow otherwise contacting the load cell arrangement. Such a reduction in unwanted signals may reduce the signal to noise ratio of the measured force. Typically, the shroud encloses substantially all of the load cell arrangement.

The shroud may have an aerodynamic shape selected to reduce resistance to fluid flow. For instance, the shroud may be rotationally symmetrical about the longitudinal axis passing through the first load cell arrangement and the sensor body.

The shroud may be formed from any suitable material, for example any material which is resilient to forces resulting from fluid flow.

The shroud may be arranged such that it is does not contact the load cell arrangement(s) and/or the sensor body.

Preferably, the distance between the shroud and the sensor body is controlled to control, for example to minimise, the extent to which fluid flow can impinge directly on the load cell arrangement. This may control unwanted signals which may be introduced by fluid flow otherwise contacting the load cell arrangement.

According to a second aspect, the invention provides a system for measuring fluid flow comprising the sensing element of the first aspect and a support structure, wherein the sensing element is connected to the support structure.

When taking measurements of fluid flow the sensing element is typically maintained in a desired location and position relative to the sensing environment.

It may be convenient for the sensing element to be provided as part of a system in which the sensing element may be mounted to a support structure. The support structure may comprise, for example, a surface within the sensing environment, a free standing structure, or a structure configured to be attached to a surface within the sensing environment. The support structure may provide for greater flexibility in the positioning of the measuring device within an environment. The support structure may be sufficiently rigid so as to maintain the position of the sensing element, when subjected to the force of fluid flow, for example, turbulent fluid flow.

The support structure may comprise any suitable surface onto which the sensing element may be affixed such as, for example, the ground, a wall, a table, or the inner-surface of a wind tunnel. The sensing element may be connected to the surface directly by means of the first load cell arrangement and optionally a second load cell arrangement.

The support structure may be configured so as to be free standing, for example such that it may be positionable upon any suitable surface within the sensing environment, without being affixed.

The support structure may be arranged so at to be attachable to any suitable surface such as, for example, the ground, a wall, a table, or the inner-surface of a wind tunnel. The support structure may be attachable to a surface by any suitable attachment means, for example, by welding, bolts, screws, nails, rivets, adhesive, or any combination thereof. Advantageously, the support structure may be removably attachable to a surface, for example, to permit for maintenance of the system.

Optionally, the sensing element may be rigidly attached to the support structure. For example, the sensing element may be mounted to the support structure such that movement of the sensing element is controlled to that required to exert a force on the load cell arrangement(s). The amount of movement of the sensing element may be selectively controlled to provide a force of the magnitude required by the sensitivity of the load cell arrangement(s).

Optionally, the sensing element may be connected to the support structure by means of one or more damping members. One or more damping members may be used to vibrationally isolate the sensing element from the support structure, thereby reducing the potential for any vibrations within the support structure to be transferred to the load cells. This may minimise the effect of any movements of the support structure as caused by fluid flow or other undesirable environmental movement, thereby improving the signal-to-noise ratio.

Advantageously, the support element may comprise a frame. For instance, frames may be open structures through which fluid may flow substantially unhindered. For example, the frame may be may be arranged to form a cage within which the sensing element may be mounted. The frame may comprise a plurality of beams and supports arranged to be resilient to the forces exerted by fluid flow. The dimensions and relative positions of the beams and supports may be selected to optimise the distance between the sensing element and components of the support structure. For example, the arrangement of the support structure and the sensing element may be selected to minimise the disturbance of fluid flow caused by the support structure whilst maximising the resilience of the support structure to withstand the effects of fluid flow.

The system may further comprise a processor. The processor may be configured to calculate one or more of the speed, direction, velocity, static pressure or dynamic pressure of the fluid flow from measured force acting upon the sensing body.

Optionally, one or both of the sensing element or the support structure may further comprise a temperature sensor. The temperature sensor may be arranged to measure the temperature of the fluid, for example, within the proximity of the sensing element.

The sensing element may further comprise an accelerometer. For example, the accelerometer may be a 1-axis, 2-axis or a 3-axis accelerometer. The accelerometer may be arranged to measure the acceleration caused by movement of the sensing element resulting from movement of the support structure. For example, the measured acceleration measured by the accelerometer may provide a means of measuring the movement of the sensing element induced by movement of support structure, rather than by the force exerted on the sensing element due to fluid flow. This may help to reduce errors in the fluid flow forces detected by the load cell arrangements. This may be particularly advantageous where the support structure is mounted to, or is part of, a moving platform, for example, a vehicle.

According to a third aspect, the invention provides a method for measuring the flow of a fluid, the method comprising: providing a sensing element according to the first aspect or a system according to the second aspect; and measuring the response of the sensor body using the load cell arrangement.

When positioned in a sensing environment such that the sensor body is subjected to fluid flow, the sensor body deflects in response to the pressure force exerted upon it by fluid flow. The deflection response of the sensor body imparts a force on the first, and optionally second, load cell arrangements to which it is connected. Thereby, the force incident upon the sensor body, as a result of fluid flow, can be measured using the load cell arrangement(s).

Preferably, for arrangements of the sensing element comprising a first and a second load cell arrangement, the response measured by the first and second load cell arrangements may be averaged. This may reduce the impact of any signal noise and thereby increase the accuracy of the sensing element when used to measure fluid flow.

Prior to deployment in a sensing environment, the sensing element may be calibrated in a controlled environment, such as, a wind tunnel.

Prior to deployment of the sensing element in a sensing environment, the first and/or optional second load cell arrangement may be calibrated using calibrated weights.

The method may comprise the step of deriving one or more of the speed, direction, velocity, static pressure or dynamic pressure of the fluid flow from the measured response.

According to a further aspect, the invention provides for the use of the sensing element according to the first aspect or a system according to the second aspect for measuring fluid flow. In particular, the sensing element and/or the system may be used to measure turbulent fluid flow, such as, during a blast event.

BRIEF DESCRIPTION OF THE DRAWINGS

The invention will now be described, purely by way of example, with reference to the accompanying drawings, in which.

DETAILED DESCRIPTION

Figure 1:
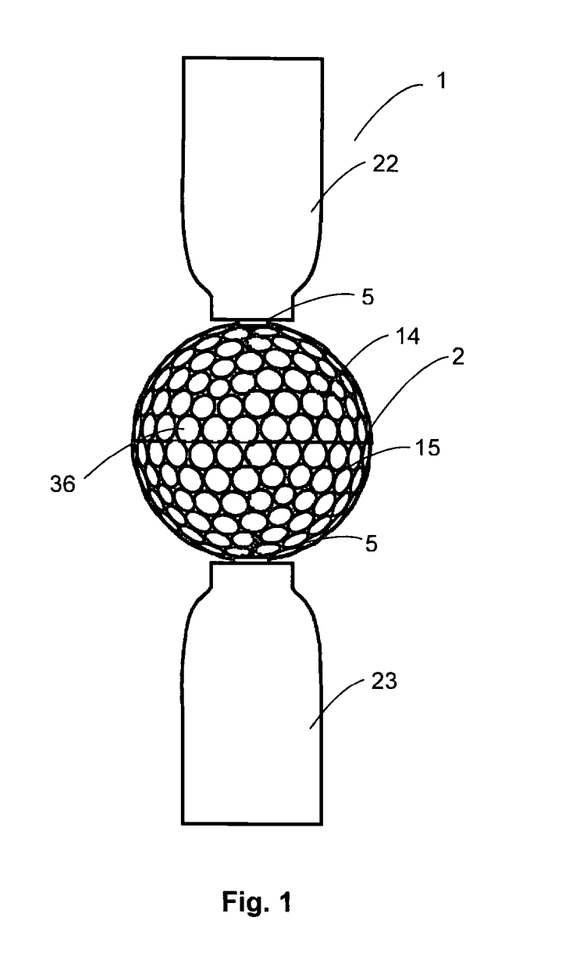
FIG. 1 shows a side elevation illustration of a sensing element according to a first aspect the invention.
Figure 2:
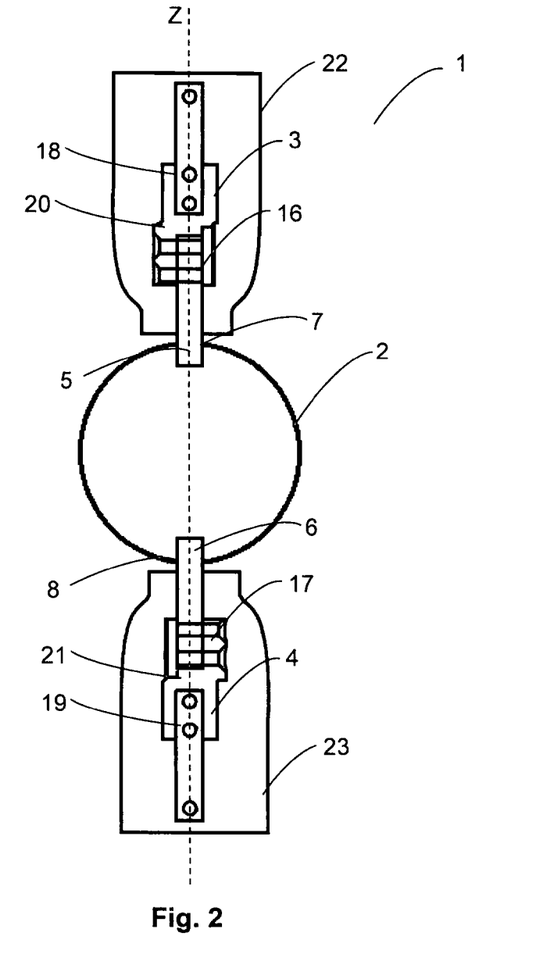
FIG. 2 shows a side elevation cross sectional illustration of a sensing element according to a first aspect of the invention.
Figure 3:
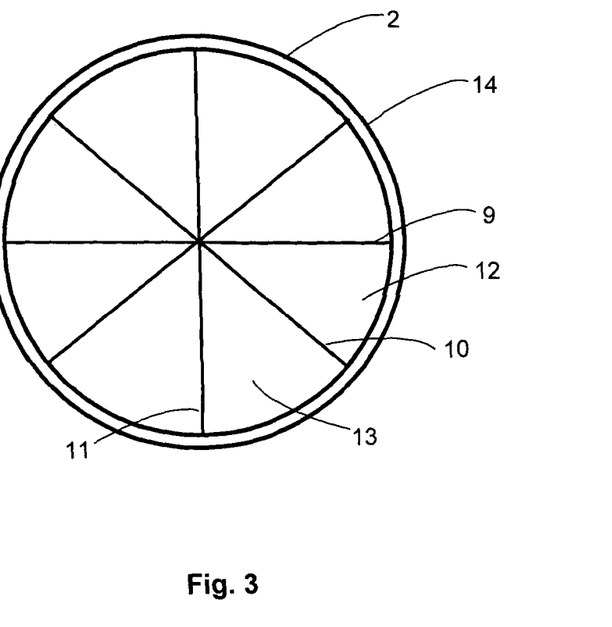
FIG. 3 shows a top-down cross-sectional illustration of the interior of a sensor body of a sensing element according to a first aspect of the invention.

FIG. 1 shows a side elevation illustration of a sensing element 1 according to a first aspect the invention. FIG. 2 shows a side elevation cross sectional illustration of a sensing element 1 according to a first aspect of the invention. FIG. 3 shows a top-down cross-sectional illustration of the interior of a sensor body 2 of a sensing element 1 according to a first aspect of the invention. The sensing element 1 comprises a spherical sensor body 2 which is attached to both a first load cell arrangement 3 and a second load cell arrangement 4. The first load cell arrangement 3 and the second load cell arrangement 4 are positioned opposite one another at either side of the sensor body 2. The longitudinal axis, indicated by dashed line Z, passes through the first load cell arrangement 3, the second load cell arrangement 4 and the sensor body 2.

The load cell arrangements 3, 4 are attached to the sensor body 2 by means of protrusions 5, 6 which extend from the respective first and second load cell arrangements 3, 4 into openings 7, 8 within the sensor body 2. The protrusions 5, 6 are secured in place within the sensor body 2 using adhesive but other suitable fastening means may be used. The protrusions 5, 6 as shown are formed as an integral part of the load cell arrangements 3, 4 but could equally be arranged as an additional element attached to the load cell arrangements 3, 4.

The sensor body 2 is formed from a nylon polymer and is substantially spherical having an outer diameter of 50 mm. The sensor body 2 is substantially hollow and comprises a number of interior support members 9, 10, 11 which bisect the interior of the sensor body 2, thereby partitioning the interior into a plurality of hollow wedge-shaped segments 12, 13. The interior supports 9, 10, 11 are formed from the same nylon material as the sensor body 2 but could equally be formed from any other suitably rigid material.

The whole of the outer surface 14 of sensing element 2 comprises a textured region 15 formed from a plurality of concave depressions 36. The concave depressions 36 have a have a hemispherical profile with a diameter of approximately 10 mm and a maximum depth of approximately 0.5 mm.

Each of the first and second load cell arrangements 3, 4 comprises a first load cell 16, 17 for detecting load in the xy plane and a second load cell 18, 19 for detecting load along the longitudinal axis. The first load cells 16, 17 and second load cells 18, 19 are attached to an isolating member 20, 21. The isolating members 20, 21 are formed from plastic. The load cells 16, 17, 18, 19 are strain gauge load cells which comprise a wheatstone bridge configuration to convert mechanical energy into an electrical signal.

The device 1 further comprises shrouds 22, 23 which wholly enclose the first and second load cell arrangements 3, 4. The shrouds 12, 23 are substantially cylindrical in shape and reduce in cross sectional area at the end arranged closest to the sensor body 2.

Figure 4:
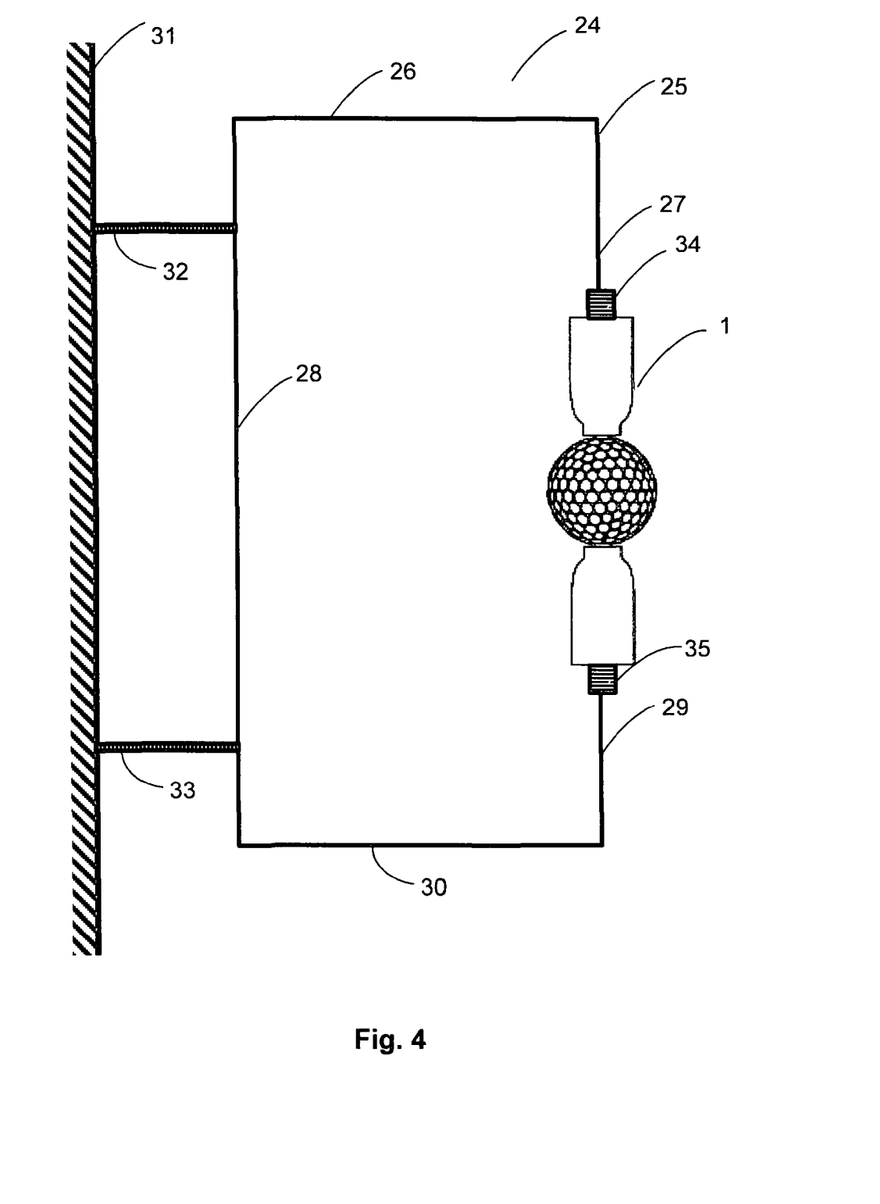
FIG. 4 shows a side elevation illustration of a system for measuring fluid flow according to the second aspect of the invention.

FIG. 4 shows a side elevation illustration of a system for measuring fluid flow 24 according to second aspect of the invention. The system 24 comprises a support structure 25 arranged as a rectangular frame formed from support members 26, 27, 28, 29, 30. The support structure 25 comprises fixing means 32, 33 by which the support structure 25 is fixed onto surface 31. The fixing means 32, 33 are each formed from a supporting bracket and a bolt. The distance between the sensing element 1 and the surface 31 is 400 mm.

The system 24 further comprises a sensing element 1 which is mounted within the support structure 25. The sensing element 1 is connected to the support structure 35 by means of damping members 34, 35.

Figure 5:
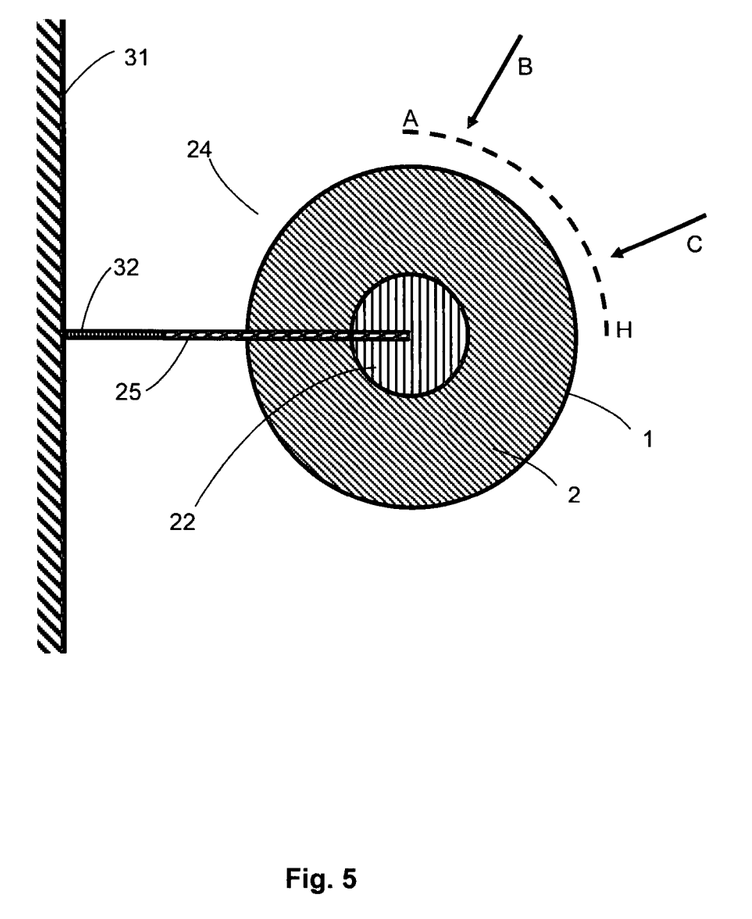
FIG. 5 shows a top-down illustration of a system for measuring fluid flow according to the second aspect of the invention when in use.
Figure 6:
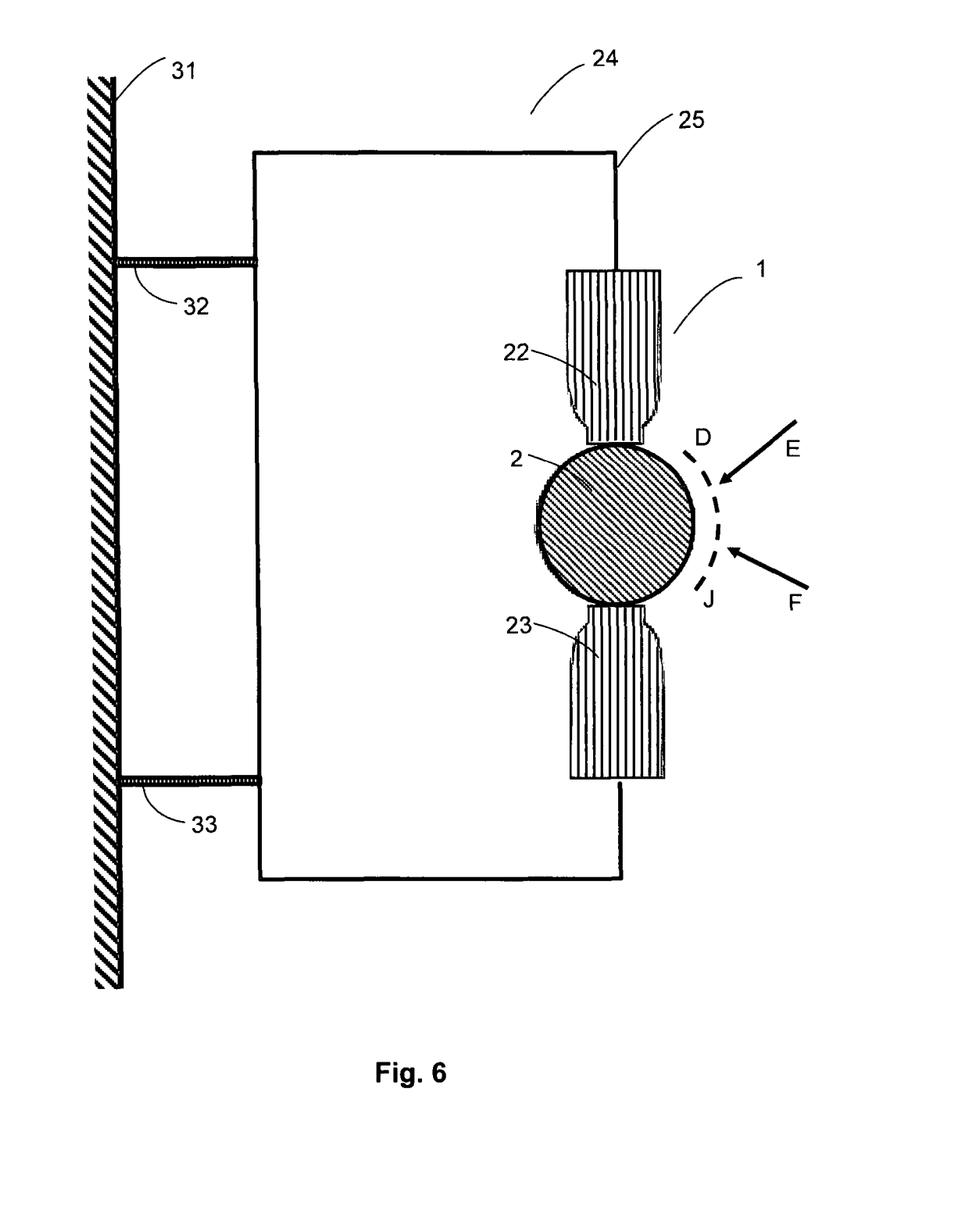
FIG. 6 shows a side elevation illustration of a system for measuring fluid flow according to the second aspect of the invention when in use.

FIG. 5 shows a top-down illustration of a system for measuring fluid flow 24 according to the second aspect of the invention when in use. FIG. 6 shows a side elevation illustration of a system for measuring fluid flow 24 according to the second aspect of the invention when in use. Sensing element 1 is attached to surface 31 by means of support structure 25 which comprises fixing means 32.

In use, force is exerted upon the sensing body 2, of sensing element 1, by fluid flow contacting the surface of the sensing body 2. Fluid flow may strike the sensing body from any direction. As illustrated in FIG. 6, fluid flow may strike the sensor body from any direction in the xy plane, for example, between the angle indicated by the arc A-H. Fluid flow in the direction of arrow B causes the sensing body 2 to move relative to the first and second load cell arrangements 22, 23 which are held in position by the support structure 25. The response of the sensing body 2 to fluid flow in the direction of arrow B is measured, as a force, by the load cells within the first and second load cell arrangements 22, 23. A change in fluid flow from the direction indicated by arrow B to the direction indicated by arrow C causes a change in the direction of the relative motion between the sensing body 2 an the load cell arrangements 22, 23. The force exerted upon the sensor body 2 by fluid flow in the direction of arrow C is measured by the load cells within the load cell arrangements 22, 23.

In this example, as the direction of fluid flow changes from that indicated by arrow B to that indicated by arrow C the magnitude of the fluid flow remains constant. The sensor body 2, having circular rotational symmetry, therefore exhibits a substantially similar response to the fluid flow indicated by both arrows B and C. In particular, the sensor body 2 is deflected relative to the load cell arrangements 23 by the same amount, as a result of the constant magnitude of fluid flow, but in a direction corresponding to the direction of arrows B and C respectively.

As illustrated in FIG. 6, fluid flow may also strike the sensor body from any direction other than the xy plane, for example, in any direction between the angle indicated by the arc D-J. Fluid flow in the direction of arrow E causes the sensing body 2 to move relative to the first and second load cell arrangements 22, 23 which are held in position by the support structure 25. The force exerted on the sensing body 2 by the fluid flow in the direction of arrow E is measured by the load cells within the first and second load cell arrangements 22, 23. A change in fluid flow from the direction indicated by arrow E to the direction indicated by arrow F causes a change in the direction of the relative motion between the sensing body 2 an the load cell arrangements 22, 23. The force exerted upon the sensor body 2 by fluid flow in the direction of arrow F is measured by the load cells within the load cell arrangements 22, 23.

In this example, as the direction of fluid flow changes from that indicated by arrow E to that indicated by arrow F the magnitude of the fluid flow remains constant, said magnitude being equal in value to the fluid flow indicated by arrows B and C of FIG. 6. The sensor body 2, having circular rotational symmetry, therefore exhibits a substantially similar response to the fluid flow indicated by arrows B, C, E and F. In particular, the sensor body 2 is deflected relative to the load cell arrangements 23 by the same amount, as a result of the constant magnitude of fluid flow, but in a direction corresponding to the direction of arrows B, C, E and F respectively.

Figure 7A:
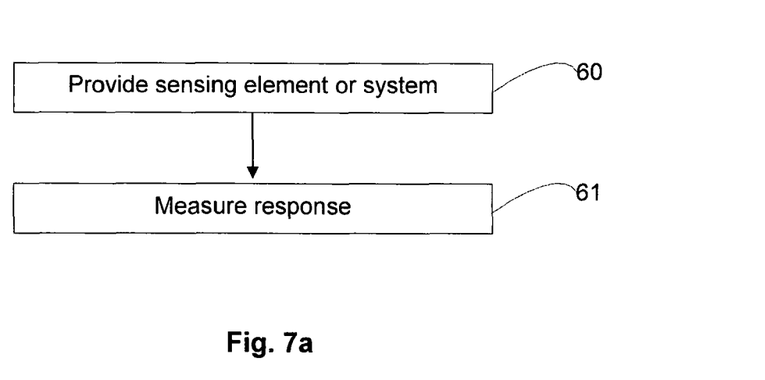
FIGS. 7a and 7b show a flow diagram illustrating a method according to a third aspect of the invention.
Figure 7B:
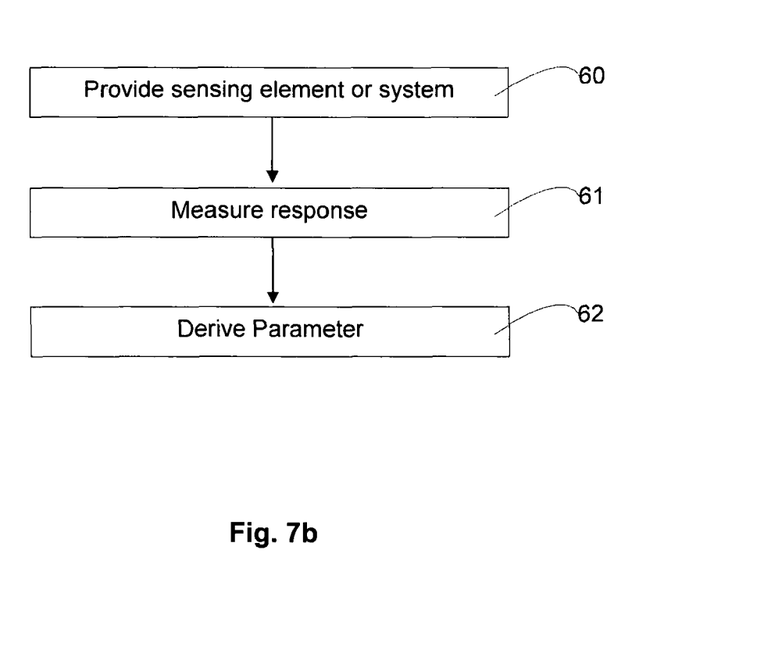

FIGS. 7a and 7b show a flow diagram illustrating a method according to a third aspect of the invention. A sensing element or system is provided 60 within a fluid flow environment of interest. The response of the sensing element to forces exerted by fluid flow are measured 61 by the load cell(s) within the load cell arrangement(s). Parameters including the speed, direction, velocity, static pressure and dynamic pressure of the fluid flow are then derived 62 from the measured response.

The invention claimed is:

1. A sensing element for use in a system for measuring fluid flow, the sensing element comprising a sensor body and a first load cell arrangement connected to the sensor body, wherein the sensor body has a three dimensional shape which is rotationally symmetric about a longitudinal axis passing through the first load cell arrangement and the sensor body, wherein the first load cell arrangement is configured to measure a force exerted on the sensor body by fluid flow in at least an xy plane perpendicular to the longitudinal axis, and wherein the sensor body comprises an outer surface and wherein the outer surface comprises a texture that comprises a plurality of concave depressions, each depression having a hemispherical profile.

2. The sensing element according to claim 1, wherein the sensor body has n-order rotational symmetry about the longitudinal axis, where n>2.

3. The sensing element according to claim 1, wherein a shape of the sensor body is selected from a sphere, an ellipsoid, and a cylinder.

4. The sensing element according to claim 1, wherein a shape of the sensor body is selected from a polyhedron, a regular polyhedron and a regular prism.

5. The sensing element according to claim 1, wherein the sensor body comprises a polymeric material.

6. The sensing element according to claim 1, wherein a mass of the sensor body is selected to control an inertial response of the sensor body when subjected to fluid flow.

7. The sensing element according to claim 1, wherein the sensor body is hollow.

8. The sensing element according to claim 1, wherein the sensing element comprises a second load cell arrangement, and wherein the first load cell arrangement and the second load cell arrangement are arranged at opposing sides of the sensor body.

9. The sensing element according to claim 8, wherein at least one of the first load cell arrangement and the second load cell arrangement is further configured to measure the force exerted on the sensing element by fluid flow along the longitudinal axis.

10. The sensing element according to claim 8, wherein the sensing element comprises one or more shrouds, and wherein said shrouds are arranged to enclose or partly enclose one or both of the first load cell arrangement and the second load cell arrangement.

11. The sensing element according to claim 8, wherein one or both of the first load cell arrangement and the second load cell arrangement comprises one or more strain gauges.

12. The system for measuring fluid flow comprising the sensing element of claim 1 and a support structure, wherein the sensing element is connected to the support structure.

13. The system according to claim 12, wherein the sensing element is connected to the support structure by means of one or more damping members.

14. A method for measuring a flow of a fluid, the method comprising:
providing a sensing element according to claim 1; and
measuring a response of the sensor body using the first load cell arrangement.

15. The method of claim 14, further comprising deriving one or more of a speed, direction, velocity, static pressure or dynamic pressure of the fluid flow from the measured response.

16. A method of using the sensing element according to claim 1.

17. The sensing element according to claim 1, wherein the sensor body comprises one or more internal support members that are arranged in a honey comb structure.

18. The sensing element according to claim 17, wherein the one or more internal support members have a greater rigidity than the outer surface.

19. The sensing element according to claim 1, wherein the outer surface of the sensor body is configured to be deformable in response to a fluid force incident on the sensor body.

20. The sensing element according to claim 1, wherein the texture is selected to control a coefficient of drag of the sensor body such that the coefficient of drag remains constant over a range of fluid flow velocities of interest.

* * * * *